(12) United States Patent
Fierstein et al.

(10) Patent No.: US 7,747,864 B2
(45) Date of Patent: Jun. 29, 2010

(54) DVD IDENTIFICATION AND MANAGED COPY AUTHORIZATION

(75) Inventors: Scott J. Fierstein, Seattle, WA (US); James M. Alkove, Woodinville, WA (US)

(73) Assignee: Mircosoft Corporation, Redmond, WA (US)

( * ) Notice: Subject to any disclaimer, the term of this patent is extended or adjusted under 35 U.S.C. 154(b) by 1035 days.

(21) Appl. No.: 11/477,841

(22) Filed: Jun. 29, 2006

(65) Prior Publication Data

US 2008/0005802 A1    Jan. 3, 2008

(51) Int. Cl.
 *H04L 9/32* (2006.01)
 *G06F 21/00* (2006.01)

(52) U.S. Cl. .................... 713/176; 705/57; 726/31

(58) Field of Classification Search ............ 713/193, 713/158, 181, 176; 726/27, 28, 5; 382/100
See application file for complete search history.

(56) References Cited

U.S. PATENT DOCUMENTS

| | | | |
|---|---|---|---|
| 6,343,281 B1 * | 1/2002 | Kato ......................... | 705/57 |
| 6,871,012 B1 | 3/2005 | Evans | |
| 7,035,200 B2 * | 4/2006 | Selinfreund et al. ......... | 369/288 |
| 2002/0059620 A1 * | 5/2002 | Hoang ...................... | 725/87 |
| 2003/0028796 A1 | 2/2003 | Roberts et al. | |
| 2003/0195854 A1 * | 10/2003 | Wittkotter .................. | 705/51 |
| 2005/0047756 A1 | 3/2005 | Evans | |
| 2005/0278256 A1 | 12/2005 | Vandewater et al. | |
| 2006/0048132 A1 | 3/2006 | Chen et al. | |
| 2006/0048236 A1 | 3/2006 | Multerer et al. | |
| 2006/0059571 A1 | 3/2006 | Chen et al. | |
| 2006/0062426 A1 * | 3/2006 | Levy et al. ................. | 382/100 |
| 2006/0078111 A1 | 4/2006 | Hollar | |
| 2008/0005802 A1 * | 1/2008 | Fierstein et al. ............. | 726/27 |

* cited by examiner

*Primary Examiner*—Gilberto Barron, Jr.
*Assistant Examiner*—Soheila Davanlou
(74) *Attorney, Agent, or Firm*—Mayer & Williams PC

(57) ABSTRACT

A "managed copy" capability is provided that is both sanctioned and supervised by a service provider so that multimedia content distributed on optical media such as DVD can be copied and used by a client in a controlled manner. In an illustrative example, a content provider generates a fingerprint using heuristics and/or other data that uniquely identifies a multimedia release, like a feature film, as being authorized for copying according to defined usage rules. A managed copy service authorizes the client to make a copy of a source DVD if that source is found to match a stored fingerprint. An identification response, which may include encoding parameters and usage rules, provides confirmation to the client that content on the source DVD is authorized to be copied. The client copies content from the source to another medium in compliance with the identification response.

13 Claims, 12 Drawing Sheets

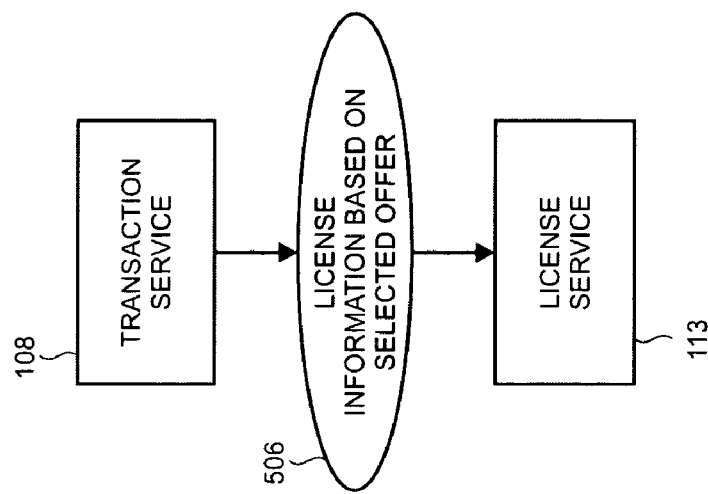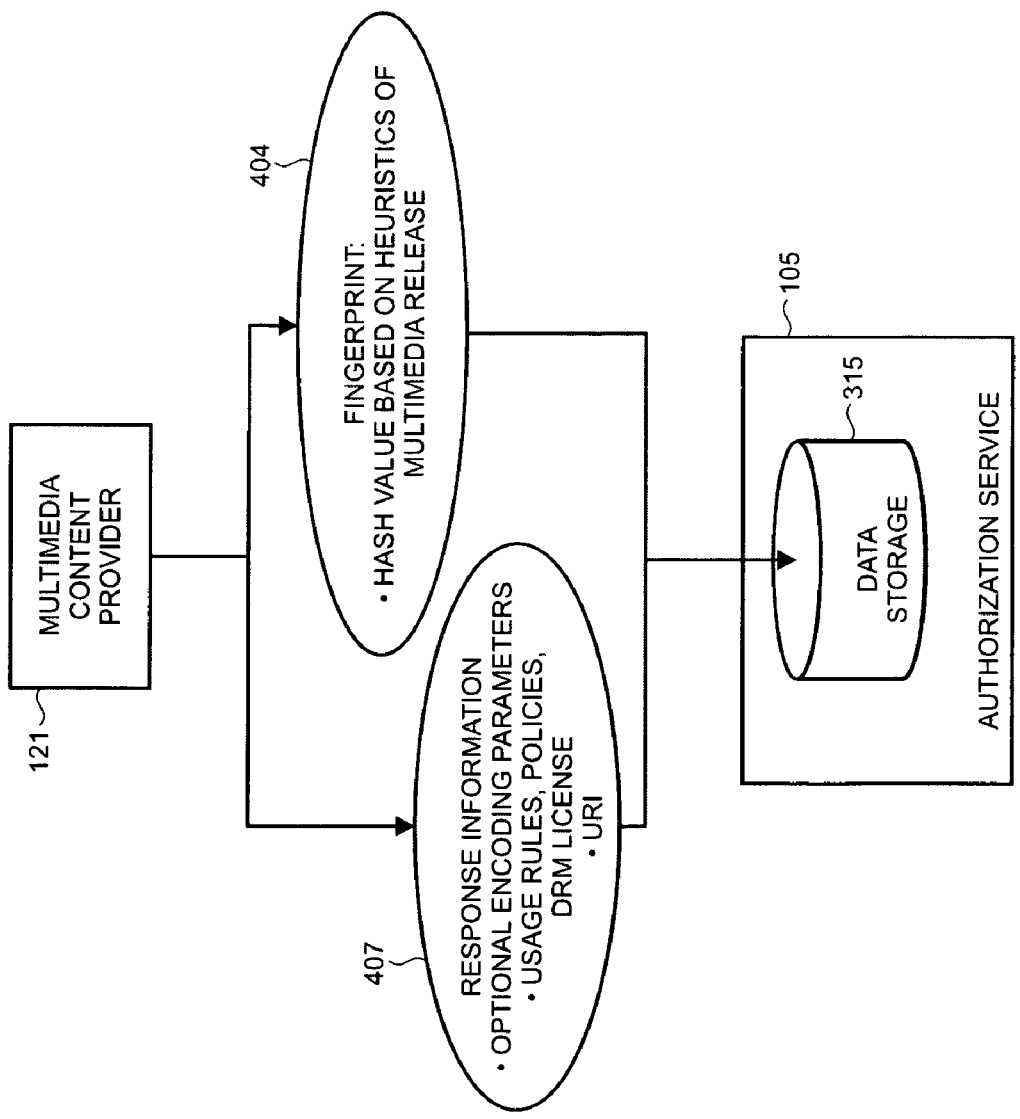

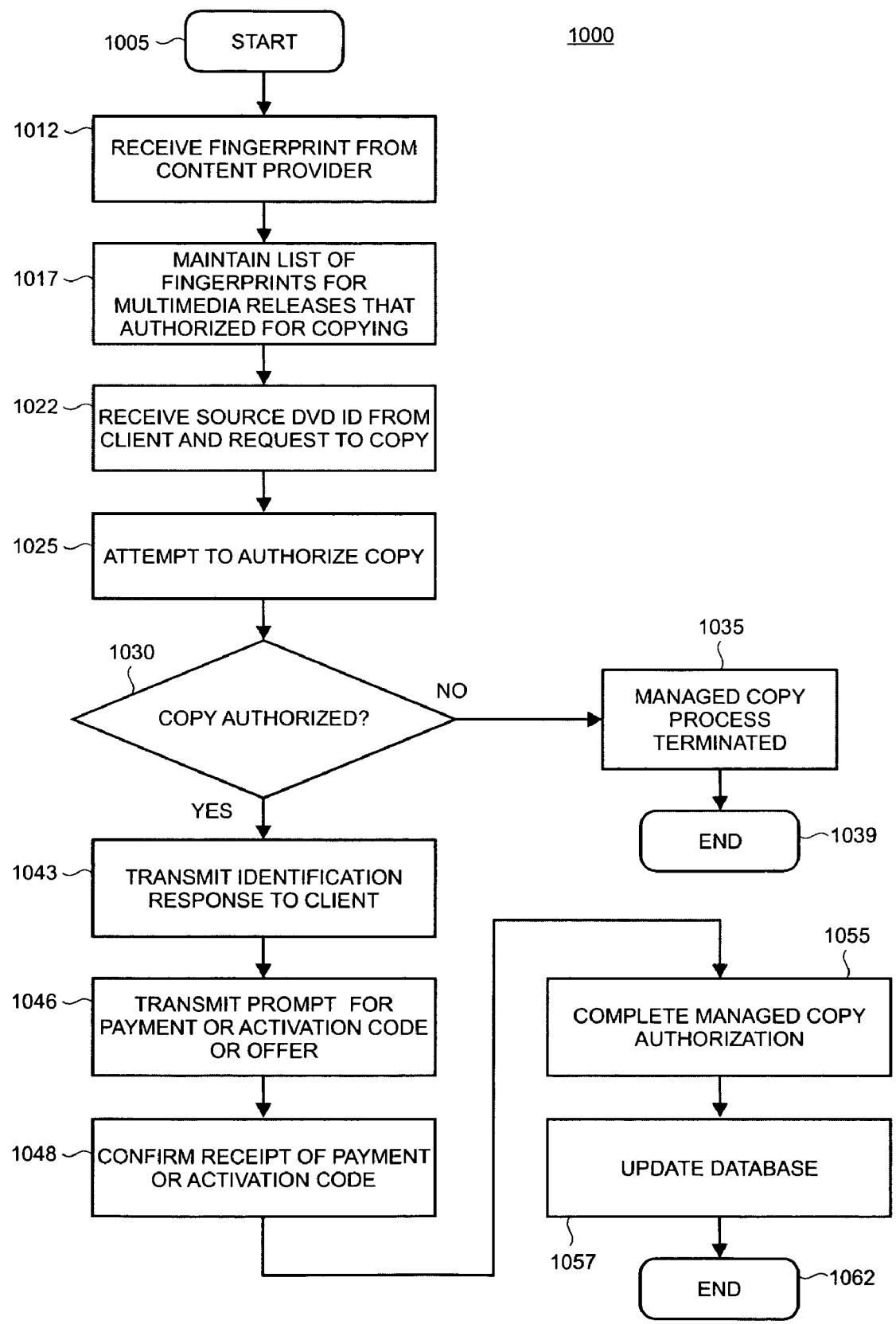

DVD IDENTIFICATION AND MANAGED COPY AUTHORIZATION

BACKGROUND

Digital versatile discs ("DVDs") are commonly used to distribute digital multimedia content such as video (e.g., movies and television programming), music, software and games. Current DVDs use a copy-protection methodology know as Content Scrambling System, or "CSS," to prevent copying of the digital multimedia content stored on the DVD to other storage media, through "burning" to an optical disc or by copying to a computer's hard disk drive, for example. Next generation DVDs, which have significantly higher storage density than current formats, are also planned to utilize copy protection (for example, Advanced Access Content System or "AACS") to implement similar types of copy-protection capabilities. Given the ease at which digital data can otherwise be copied without any degradation in quality, multimedia content providers and producers generally view copy-protection as being necessary to protect the often considerable investment required to create the multimedia content.

As consumers become increasingly familiar with purchasing, renting and using multimedia content, a variety of efforts have been made to give more flexibility in how properly acquired digital content can be consumed. For example, consumers often expect to be able to play multimedia content on devices such as personal computers ("PCs") and portable media players, as well as share content across home networks. Copy protection schemes that are cumbersome to use, or which do not adequately meet consumer expectations as to fair usage of purchased or rented content, are more likely to be circumvented, and multimedia content providers using such copy-protection are often viewed unfavorably.

SUMMARY

A consumer using a client device, such as a multimedia player or PC, is provided with an easy-to-use "managed copy" capability that is both sanctioned and supervised by a service provider so that multimedia content distributed on optical media such as DVD can be copied and used in accordance with defined usage rules in a controlled manner.

In an illustrative example, a content provider uniquely identifies a multimedia release, such as a feature film, that is authorized to be copied according to defined usage rules by generating a fingerprint that uniquely identifies the multimedia release based on heuristics captured from the multimedia release. The fingerprint is received and stored by a managed copy service. Responsively to a request from the client, the managed copy service authorizes the client to perform a managed copy of a source, such as a DVD, if that source is found to match a stored fingerprint. The managed copy service authorization may be part of an identification response that is arranged to include such information as a uniform resource identifier to point to additional sources of information, and the usage rules and encoding parameters to be enforced during the client's performance of the managed copy.

The identification response provides a confirmation to the client that a multimedia content provider has authorized the content to be copied. Responsively, the client decrypts multimedia content from the source and then encodes or transcodes (and optionally, re-encrypts) the multimedia content as it is copied on another medium, for example, a hard disk drive, optical disc or portable media player in compliance with the identification response. For example, the copy is encoded for playback at a different quality or resolution than the source, is subject to restrictions on playback count or time, or is limited in use for generating subsequent copies, as provided by parameters contained in the identification response.

Optionally, the client and managed copy service implement a transaction such as a payment or the usage and verification of an activation code before the managed copy is authorized by the service and then subsequently performed by the client. Consumers are thus enabled with an ability to "rip" (i.e., make) copies of their content on DVD with the same ease as non-copy-protected audio compact discs ("CDs").

The present arrangement advantageously enables content providers to manage the proliferation of copies of their high-value multimedia content and maintain control over the quality and use of such copies. In addition, "up sell" opportunities are realized by enabling consumers to purchase merchandise, services or other media content that is related to the multimedia release on the DVD. For example, during the managed copy process the consumer may be provided with an opportunity to purchase the multimedia release soundtrack or related videogame on CD or via download, or purchase movie tickets to an upcoming movie sequel or another multimedia release of a similar genre.

Consumer expectations are also better satisfied as multimedia content can be readily transferred and consumed using preferred devices in desired locations while maintaining compliance with applicable usage rules or DRM licenses. In addition, by providing consumers with a straightforward process to make (and optionally, pay for) copies of multimedia content, the copy-protection for the multimedia content is more likely to be respected.

DESCRIPTION OF THE DRAWINGS

FIG. 4 is a block diagram showing an illustrative flow of information between a multimedia content provider and an authorization service;

FIG. 5 is a block diagram showing an illustrative flow of information between a transaction service and a license service;

FIG. 10 is a flowchart of an illustrative method for a service to provide a managed copy service to a client;

DETAILED DESCRIPTION

In the description of DVD identification and managed copy authorization that follows, an illustrative multimedia release is utilized which is defined as feature film that is distributed on DVD to the home entertainment market subsequent to the feature film's theatrical release. However, it is emphasized that the principles described herein are applicable to other multimedia types including, for example, music, software and games.

In many cases with a new feature film supplied into the home entertainment market, a multimedia content provider implements a distribution strategy that utilizes several different versions of the multimedia release on DVD. Such versions may vary, for example, by screen aspect ratio (e.g., anamorphic widescreen and full screen versions), as well as language, sound options (e.g., Dolby Digital, Digital Theatre System) and subtitling options and region coding among other differences. Region coding—a technique that permits DVD players purchased in a particular geographic region to play only DVDs encoded for playback in that region—is generally employed (among other reasons) to support a worldwide roll out schedule where a feature film is released to various parts of the world at different times. Content providers often carefully time releases to exploit tie-ins, theatrical promotion, or culturally-established schedules of consumer behavior such as national holidays and special events in a particular region. DVD region coding thus provides a way to ensure that consumers in different parts of the world cannot watch feature films on DVD intended for other markets.

Presently, DVDs do not store information that allows the multimedia release stored on the DVD to be predictably identified by a DVD player (such as one operating on a PC or implemented with a consumer electronic device). Using a fictitious multimedia release as an example, there is no way for the player to know that a DVD loaded into the drive is entitled "The Microsoft Movie" and has a widescreen format with Region 1 coding. And, DVDs are not able to be uniquely identified since the discs do not use, for example, serial numbers, e.g., The Microsoft Movie serial number 123456. There is also no current capability for the DVD player to identify a DVD as having been purchased by the consumer or just rented.

In addition, content providers are presently not motivated to build copy permission into the DVD itself because there is no current mechanism by which content providers can control the number of and quality of the copies made nor receive payments for the copies made and used by consumers. These problems are addressed, among others, by the features and capabilities provided by the arrangements described below.

Figure 1:
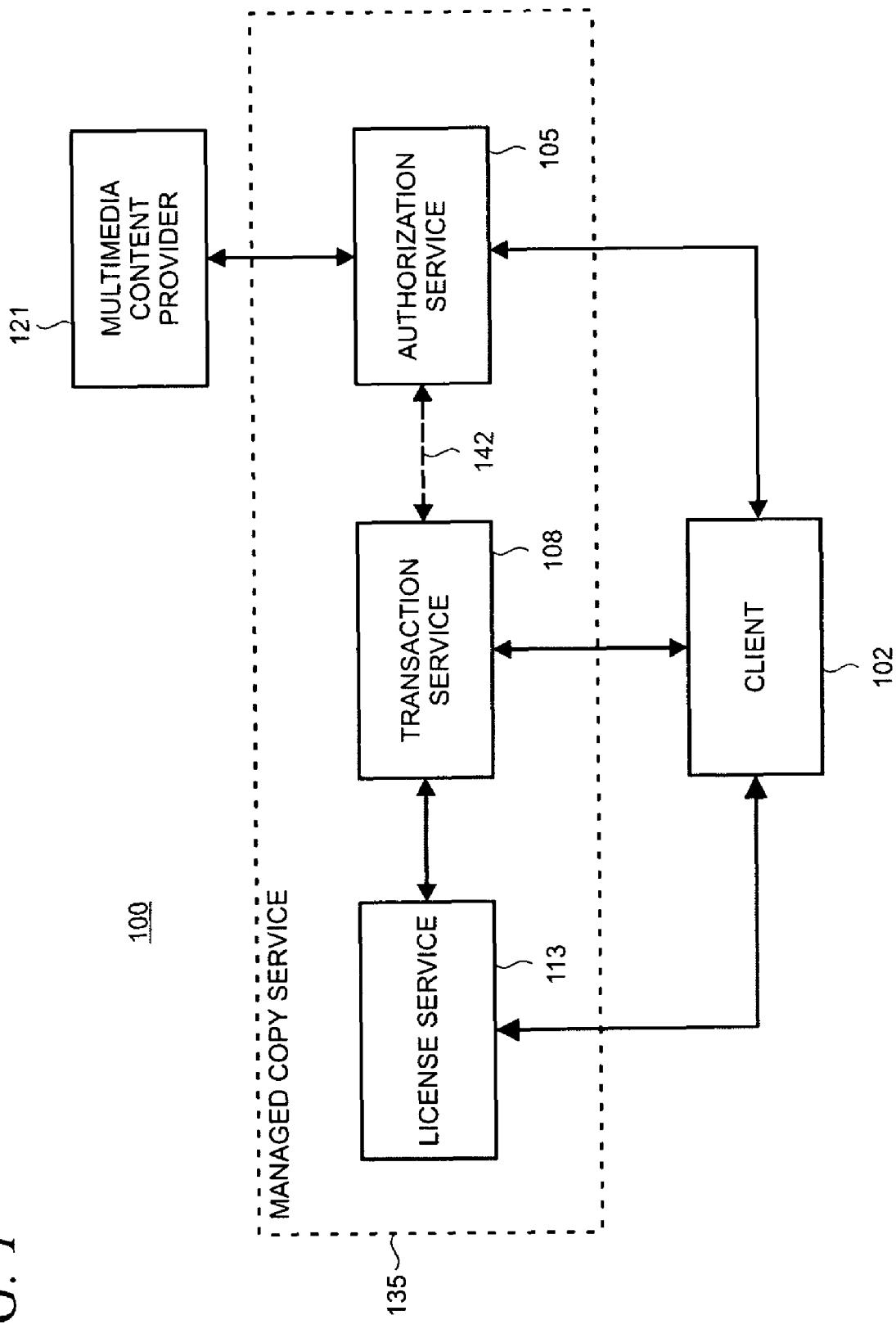
FIG. 1 is a block diagram of an illustrative arrangement for enabling DVD identification and managed copy authorization.

Turning now to FIG. 1, a block diagram is provided for an illustrative arrangement 100 for enabling DVD identification and managed copy authorization. A client 102 is arranged in communicate with an authorization service 105, a transaction service 108 and a license service 113. In most applications, client 102 communicates with such services over a network such as the Internet. Client 102 is typically configured as an electronic device, such as a PC or consumer electronic device, with which a user interacts to consume multimedia content. As shown in FIG. 1, a multimedia content provider 121 is arranged to communicate with the authorization service 105. The transaction service 108 is operatively coupled to the license service 113. The authorization service 105 is optionally coupled to the transaction service 108 as indicated by the dashed line 142.

Authorization service 105, transaction service 108 and license service 113, in this illustrative example, are each implemented using one or more application and data servers that are arranged to provide the services described herein. In some applications of DVD identification and managed copy authorization, authorization service 105, transaction service 108 and license service 113 are operated by individual service providers. Alternatively, a single service provider may operate two, or all three of the services. Authorization service 105, transaction service 108 and license service 113, in operative combination, form a managed copy service 135 as indicated by the dashed rectangle in FIG. 1.

Managed copy service 135 is alternatively implemented using a local arrangement. For example, the functions performed by authorization service 105, transaction service 108 and license service 113 are implemented using one or more software applications or code sets that reside on the client 102 itself or on one or more devices that are locally accessible by the client 102. Data required by a service (for example, fingerprint and identification response information as described below) is typically pre-provisioned, or may be updated periodically in cases where the client 102 is capable of accessing external data sources. Data utilized by authorization service 105, transaction service 108 and license service 113 in such local implementations may also be provided, or updated as required, using removable or optical media such as Flash memory or CDs and DVDs that is distributed to a consumer, for example, that is packaged with or made part of the content on a purchased or rented DVD.

Figure 2:
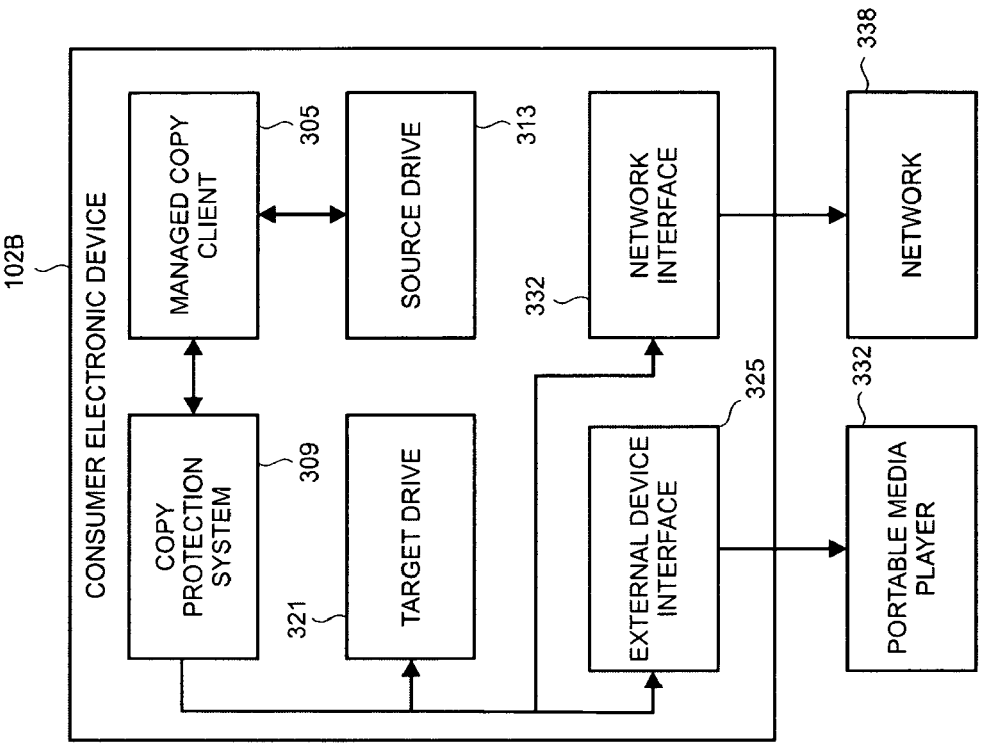
FIG. 2 is a block diagram showing an illustrative arrangement in which a client is implemented using a computing platform such as a personal computer.

FIG. 2 is a block diagram showing an illustrative arrangement in which a client 102 (FIG. 1) is implemented using a PC 102A or other computing platform such as a game console or multimedia center. A managed copy client 205 along with a copy protection system 209 are arranged, in this illustrative example, as software applications that runs on PC 102A. The managed copy client 205 and copy protection system 209 are described in more detail in the text accompanying FIG. 6.

As shown in FIG. 2, the managed copy client 205 is operatively coupled to a source drive 213 that is typically configured as an optical media drive, for example, a DVD drive, high-definition DVD drive or a CD/DVD combination drive. Such combination drives are typically arranged to read from, and write to a variety of optical media including both CDs and DVDs.

Copy protection system 209 is operatively coupled to a data storage device 218 such as a hard disk drive. An external device interface 225 such as a USB (Universal Serial Bus) interface, an IEEE 1394 (Institute of Electrical and Electronic Engineers) interface, or BlueTooth interface is also operatively coupled to copy protection system 209. In addition, copy protection system 209 is operatively coupled to a network interface 232 such as an Ethernet or Wi-Fi interface.

External device interface 225 in PC 102A is configured to communicate with a portable media player 232 which is commonly selected, for example, from one of portable video player, portable game device, mobile telephone, personal digital assistant ("PDA"), pocket PC or the like. Network interface 232 in FIG. 2 is configured to communicate over a network 238 which typically comprises a home or local area network having onward access to a wide area network such as the Internet.

Figure 3:
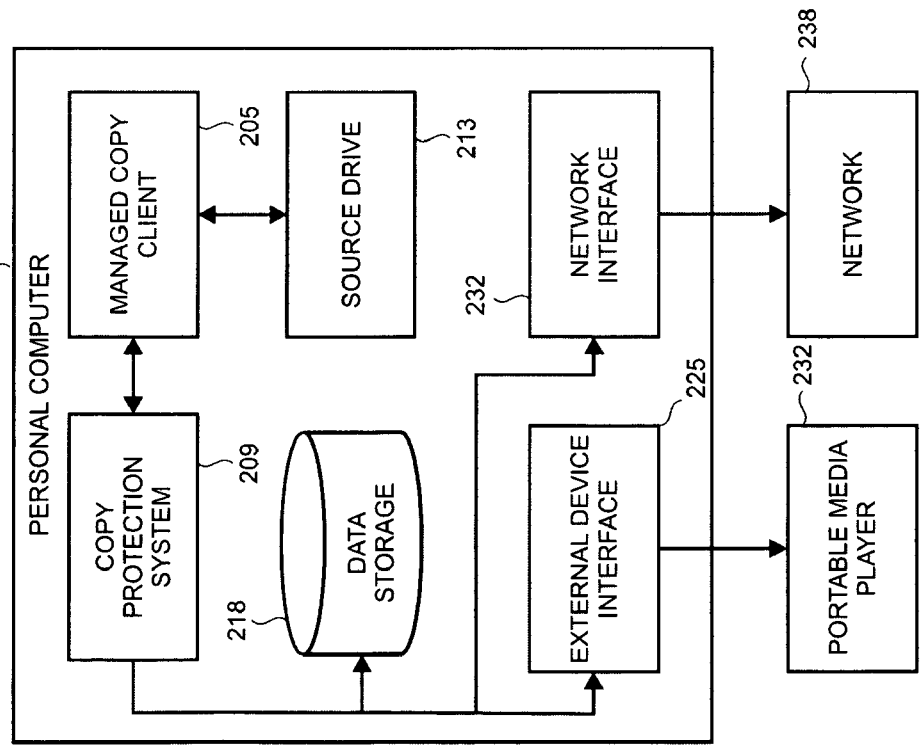
FIG. 3 is a block diagram showing an illustrative arrangement in which a client is implemented using a consumer electronic device such as a DVD player or jukebox.

FIG. 3 is a block diagram showing an illustrative arrangement in which a client 102 (FIG. 1) is implemented using a consumer electronic device 102B such as a DVD player or jukebox. In alternative examples, the consumer electronic device 102B is selected from one of set top box, home entertainment system, television with integrated DVD, or the like. Consumer electronic device 102B includes a managed copy client 305 and copy protection system 309 that arranged in a similar manner to the managed copy client 205 and copy protection system 209 shown in FIG. 2 and described in the accompanying text. Managed copy client 305 in FIG. 3 is operatively coupled to a source drive 313 such as an optical DVD drive or CD/DVD combination drive.

Copy protection system 309 is operatively coupled to a target drive 321 which is optionally utilized in some applications of DVD identification and managed copy authorization. In this illustrative example, target drive 321 is configured as a second optical drive to complement the features and capabilities of source drive 313 (it is noted that PCs such as PC 102A in FIG. 2 are also commonly equipped with second optical drives). Copy protection system 309 is further operatively coupled to an external device interface 325 and network interface 332 where such elements are arranged in a similar manner as those shown in FIG. 2 and described in the accompanying text.

External device interface 325 in consumer electronic device 102B is configured to communicate with a portable media player 332. Network interface 332 is configured to communicate over a network 338 which typically comprises a home or local area network having onward access to a wide area network such as the Internet.

FIG. 4 is a block diagram showing an illustrative flow of information between the multimedia content provider 121 (FIG. 1) and the authorization service 105 (FIG. 1). As shown, the multimedia content provider 121 provides information to the authorization service 105 including a fingerprint 404 for a multimedia release and response information 407 that is associated with a given fingerprint 404. Multimedia content provider 121 is commonly a multimedia creator or author, for example, a movie studio (e.g., a movie production company), music company (e.g., a record label), or a software or video game publisher. Alternatively, multimedia content provider is an entity which has ownership rights in the multimedia release. In addition, the multimedia content provider 121 may be an agent, representative or contracted party that provides the information on behalf of a multimedia content creator or author.

In this illustrative example, the multimedia content provider 121 utilizes fingerprint 404 to uniquely identify a multimedia release (e.g., "The Microsoft Movie," widescreen, Region 1). As shown in FIG. 4, fingerprint 404 comprises a hash value (i.e., a value that is commonly represented as a short string of random-looking letters and numbers) that is generated using heuristics captured from the multimedia release. That is, the multimedia content provider 121 creates the fingerprint 404 using a heuristic process by which predefined characteristics or aspects of the multimedia release are utilized to thereby algorithmically generate the hash.

In addition to the use of a fingerprint, other techniques can be implemented to uniquely identify a multimedia release. For example, a serial number may be encoded in, or stored on each DVD of a particular multimedia release. This technique may be satisfactory in those applications of DVD identification and managed copy authorization where modifications to DVDs are acceptable. However, in applications where no such modifications are desirable or practical, then use of the fingerprint based on heuristics captured from the multimedia release may be more preferable.

The authorization service 105 uses the heuristically generated fingerprint 404 and response information 407 from the multimedia content provider 121 when responding to a specific request from a client to engage in a managed copy process. Such information identifies the applicable requirements to be met in authorizing a particular managed copy opportunity, or "offer", for a consumer. For example, in some settings, a multimedia content provider may only have limited (i.e., not worldwide) distribution rights. In this case, the fingerprint 404 provides an ability to match an offer to a particular multimedia release and further identifies the distribution rights holder for a specific region. In other settings, a copy is only authorized upon payment of a fee, and the content is transcoded from an original format to a format that is optimized for a particular device owned by the consumer. Limits on playback in terms of time or count may also be imposed. An offer may also include one or more upsell elements in which a consumer is provided with opportunities to make additional purchases of merchandise, services or media content that are related or tied in to a particular multimedia release.

Response information 407, in this illustrative example, includes information or data passed to the authorization service 105 that is used as part of an identification response passed to the client 102. The identification response is described in more detail in the text accompanying FIG. 7.

Examples of information contained in response information 407 include a multimedia release identifier, usage rules, policies or a DRM license that are implemented by the copy protection system in the client 102 (e.g., copy protection system 209 and 309 in FIGS. 2 and 3, respectively) during the managed copy process, and a URI (Uniform Resource Identifier) that points to the location of additional sources of information. Such URI is used, in various illustrative examples, to tie in additional promotions, advertisements or other commercial or information resources to a particular managed copy user experience or session.

Other information included in response information 407 may include metadata that is pertinent to the multimedia release including, for example, Title, Chapter Information, Movie Release Date, DVD Release Date, MPAA (Motion Picture Association of America) rating, Runtime, Cast, Directed by, Produced by, Writing Credits, Genre, Cover Art, Plot/Outline, Review, Production Companies, Region Code, ISAN (International Standard Audiovisual Number), Aspect Ratio, User Rating, and Sound Mix. Such metadata is utilized to provide information to a consumer engaging in a managed copy process at the client 102 (FIG. 1), and is, in some cases, transferred along with the copy of the multimedia content during the managed copy process. For example, the use of Chapter Information enables specific television programming episodes from an episodic DVD to be identified and then copied using a managed copy process.

FIG. 5 is a block diagram showing an illustrative flow of information between the transaction service 108 (FIG. 1) and a license service 113 (FIG. 1). In this example, license information 506, comprising usage rules, policies or a DRM license that are based on an offer that is selected by a consumer, is transferred from the transaction service to a data server disposed at the license service 113. Such license information is typically generated from the response information 407 provided by the multimedia content provider 121 (FIG. 1) as shown in FIG. 4 and described in the accompanying text.

Figure 6:
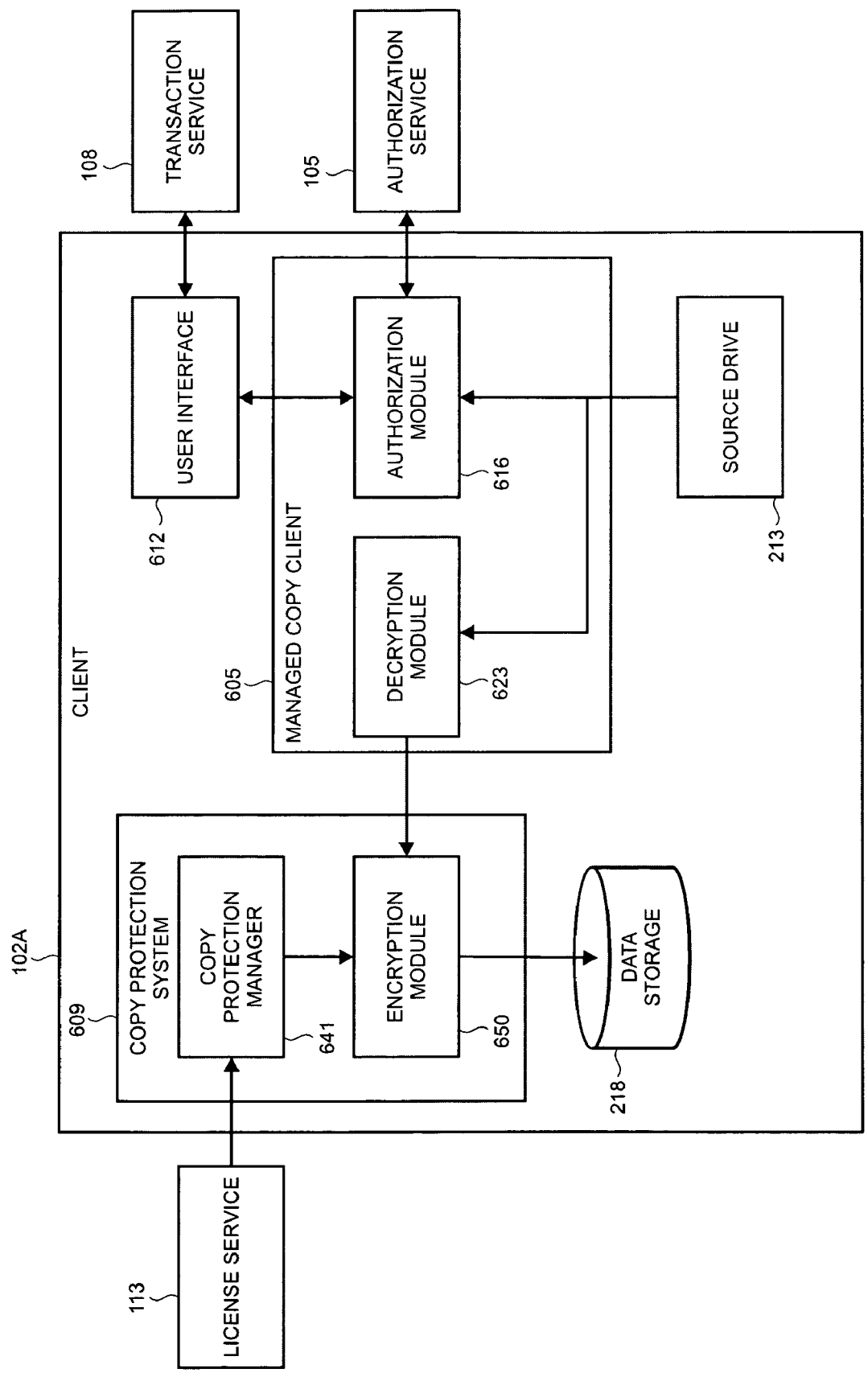
FIG. 6 is a block diagram showing details of an illustrative client that is arranged to perform a managed copy process.

FIG. 6 is an illustrative block diagram showing details of the client 102A (FIG. 1). Client 102A includes the managed copy client 205 and a copy protection system 609. Managed copy client 205 includes several components including a user interface 612, authorization module 616 and a decryption module 623.

In some applications of DVD identification and managed copy authorization, copy protection system 609 may be embodied in a DRM system that implements a regime for authorizing viewing or playback of media content on devices such as personal computers or portable media player, for example, by working in conjunction with the software players on such devices. DRM systems often employ encryption, marking of the media content with a digital watermark, or other similar techniques to impose limits on the use or distribution of the media content. Well known DRM systems include, for example, Microsoft Windows Media DRM ("WMDRM"), Apple FairPlay, Extended Copy Protection ("xCP") by Sony/BMG and Helix DRM from RealNetworks. However, it is emphasized that utilization of a DRM system is optional in the present arrangement and various levels, techniques and types and of copy protection are alternatively utilized according to the specific requirements of an application of DVD identification and managed copy authorization.

User interface 612 is arranged to communicate with transaction service 108 to facilitate the completion of a transaction that is optionally utilized in some applications of the managed copy process. The authorization module 616 is arranged to pass client requests for a managed copy to the authorization service 105 and receive authorization data from the authorization service 105. Decryption module 623 is arranged to decrypt encrypted multimedia content read from a source DVD located in source drive 213. The authorization module 616 is operatively coupled to the user interface 612 and source drive 213, as shown in FIG. 6.

Copy protection system 609 includes two components—a copy protection manager 641 and an encryption module 650. Encryption module 650 receives decrypted multimedia content from the decryption module 623 in the managed copy client 605. Copy protection manager 641 is arranged to receive license information, for example, usage rules, polices, or a DRM license from the license service 113. Copy protection manager 641 passes the license information to the encryption module 650 which utilizes the information when re-encrypting and encoding a managed copy of the multimedia content that is written to data storage device 218, for example.

Figure 7:
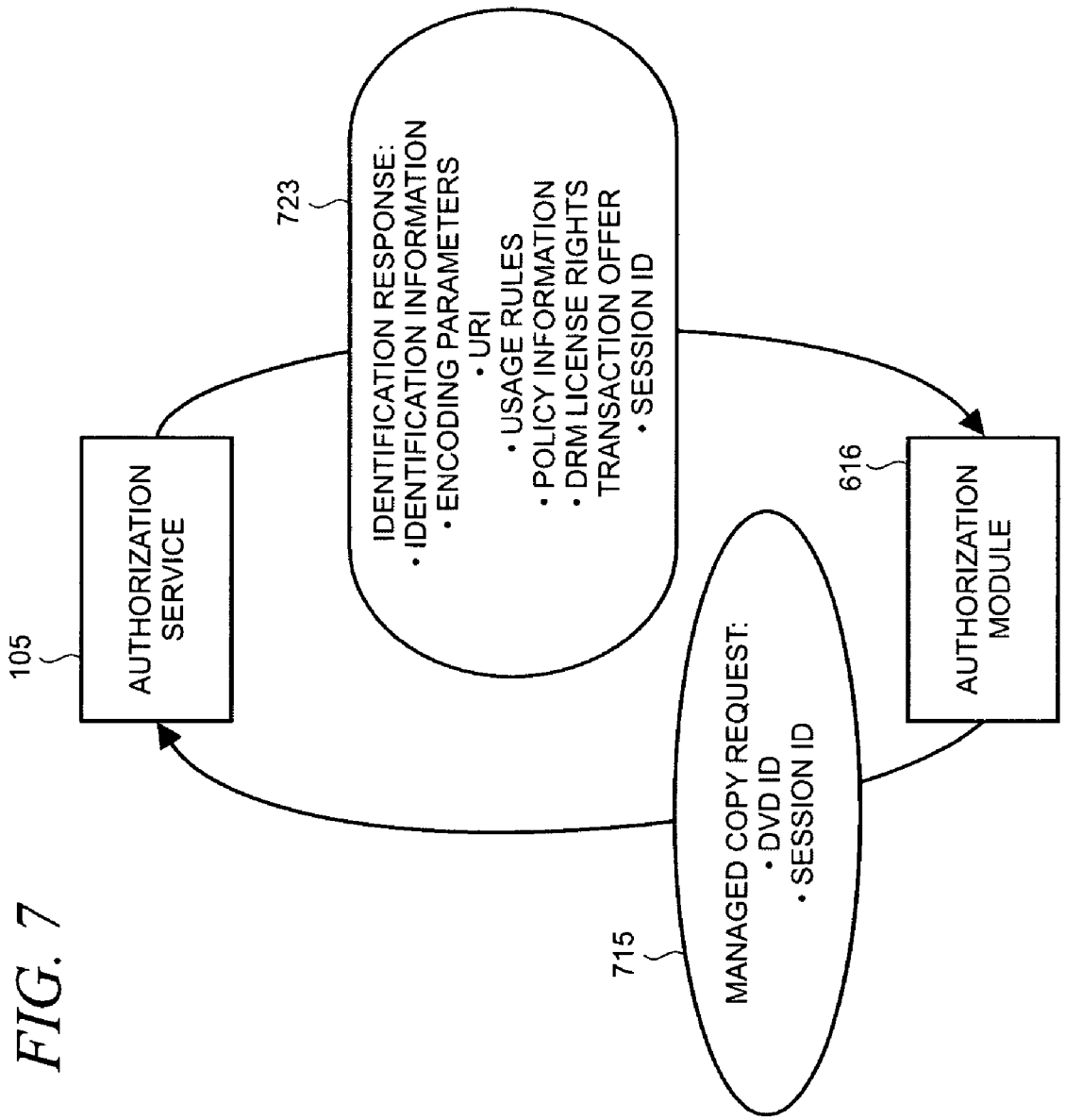
FIG. 7 is a block diagram showing an illustrative flow of information between an authorization service and an authorization module disposed in a client.

FIG. 7 is a block diagram showing an illustrative flow of information between the authorization service 105 and the authorization module 616 disposed in the managed copy client 605 (FIG. 6). Authorization module 616 generates a managed copy request 715 that is transmitted to the authorization service 105. The managed copy request 715 includes an identification of the source DVD sought to be copied, for example, using a fingerprint as well as an optionally-utilized session ID (identification). Such fingerprint is generated by the managed copy client 605 using a similar heuristic process as described above in the text accompanying FIG. 4. The authorization service 105 compares the source DVD fingerprint to fingerprints that are stored in data storage 315 (FIG. 3) to identify the source DVD as described below.

The session ID request is optionally utilized in some applications of DVD identification and managed copy authorization to track a plurality of communications between the client 102 (FIG. 1) and managed copy service 135 (FIG. 1) as a single unique session. Such single session implementation is utilized, for example, when the managed copy process uses several steps or requires a transaction such as a payment or activation code. A session ID enables all the required communications required to complete the managed copy process to be identified as a single transaction which is often helpful from a data management standpoint. In addition, for secure transactions, use of the session ID reduces the need to re-authenticate the client at each communication step.

A session ID is also beneficial in many applications to enhance the security of the session or transaction between the client 102 and managed copy service 135 (FIG. 1). In particular, mitigation against impersonation attacks (where a malicious user attempts to improperly access services by posing as a legitimate user) is afforded by using the session ID as a session token subsequent to the client's successful authentication.

If the authorization service 105 matches the fingerprint in the managed copy request to a stored fingerprint (which thus indicates that a managed copy is permitted by the multimedia content provider) then the authorization service 105 authorizes the managed copy and sends an identification response 723 to the authorization module 616. The particular steps performed by the authorization service 105 in determining if a managed copy is authorized and transmitting the identification response are shown in more detail in the flowchart of FIG. 10 and described in the accompanying text.

Identification response 723 in FIG. 7 includes a combination of information from the response information 407 (FIG. 4) and fingerprint 404 (FIG. 4) provided by the multimedia content provider 121 (FIG. 1) to the authorization service 105. The particular information included in the identification response 723 will depend on the particular requirements of a specific application of DVD identification and managed copy authorization. However, in many typical applications, identification response 723 includes multimedia release identification information, encoding parameters and usage rules, policies and/or DRM license rights that are to be enforced during the managed copy process and subsequent use of the managed copy by the consumer. Identification response 723 also optionally includes a session ID that is responsive to a session ID request from the client 102 (FIG. 1), as described above.

Figure 8B:
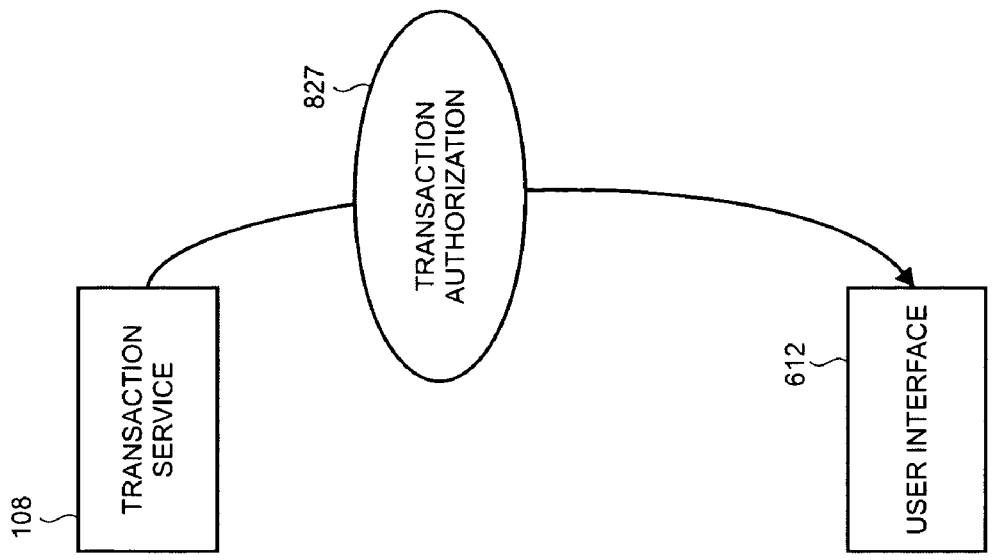
FIG. 8B is a block diagram showing an illustrative flow of additional information between a transaction service and a user interface disposed in a client.
Figure 8A:
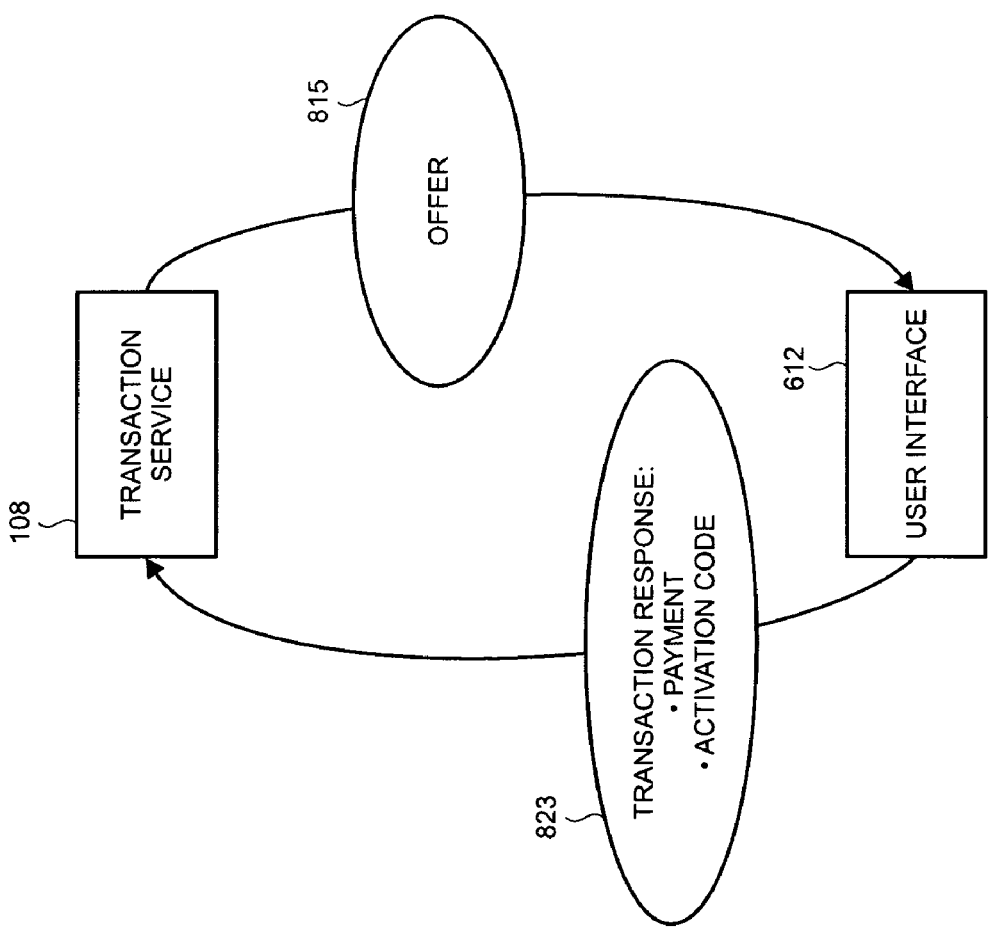
FIG. 8A is a block diagram showing an illustrative flow of information information between a transaction service and a user interface disposed in a client.

FIG. 8A is a block diagram showing an illustrative flow of information between the transaction service 108 and the user interface 612 disposed in the managed copy client 605 (FIG. 6). As noted above, a transaction is optionally utilized in cases where the multimedia content provider 121 does not wish to allow copies to be made on a free basis.

Figure 9:
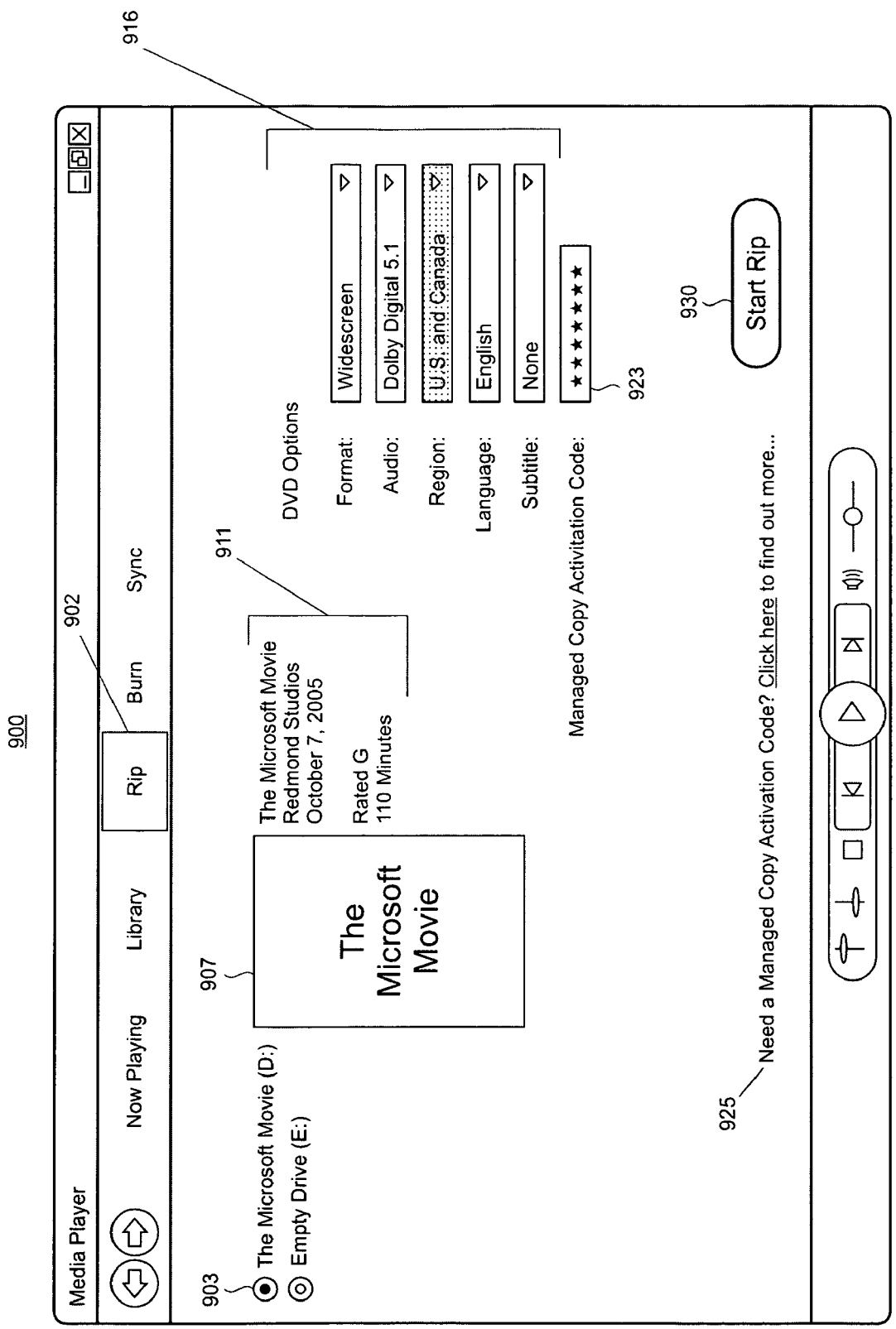
FIG. 9 is a simplified pictorial illustration of a user interface.

The transaction service 108 generates an offer which typically comprises the requirements that must be met prior to authorizing a managed copy. For example, the multimedia content provider 121 (FIG. 1) may only allow a managed copy to be made if a payment is made or an activation code is received. In this case, the authorization service 105 generates a transaction offer 815 that is displayed on the user interface 612, for example as a prompt for a payment or an activation code. Responsively to the offer, the managed copy client 605 generates a transaction response 823 that includes appropriate an payment (such as credit card information) or an activation code. The transaction service 108 confirms receipt of the payment or activation code and provides a transaction authorization 827 to the user interface 612 as shown in FIG. 8B. The particular steps performed by the transaction service 108 in implementing a transaction are shown in more detail in the flowchart of FIG. 10 and described in the accompanying text FIG. 9 is a simplified pictorial illustration of a user interface window 900 that is displayed by user interface 612 (FIG. 6). In this illustrative example, user interface window is implemented using a media player application that runs on PC 102A (FIG. 2). Shown is the screen that is displayed by the media player application when the "Rip" button 902 is activated by a consumer.

User interface window 900 shows that a DVD having the feature film "The Microsoft Movie" is loaded in drive D: (i.e., the source drive 213 in FIG. 2) as indicated by reference numeral 903. An illustration 907, which typically includes DVD cover art or other graphical elements, is provided by user interface window 900. Some background information 911 is also provided. Illustration 907 and background information 911 are examples of information that is provided from the multimedia content provider 121 (FIG. 1) to the authorization service 105 (FIG. 1) in the fingerprint 404 (FIG. 4) or response information 407 (FIG. 4). Authorization service 105 provides the information to the managed copy client 605 (FIG. 6) for display on the user interface window 900.

A plurality of DVD managed copy options are provided in user interface window 900 as drop down lists, as indicated by reference numeral 916. The number of managed copy options can vary according to specific requirements. Not all options are necessarily made available to consumers depending on the parameters defined by the multimedia content provider 121 in the fingerprint 404. For example, the region menu option is "grayed out" in FIG. 9 which indicates that no user selection may be made.

In the illustrative example shown in FIG. 9, an activation code field 923 is provided. Alternatively, a user interface screen or set of screens (not shown) are used to implement a payment transaction where the consumer enters credit card information, or uses other types of payment options such as commercial payment services. As noted above, in some settings no transaction is required by the multimedia content provider 121.

It is contemplated that the activation code is obtained by a consumer in a variety of ways. An activation code may be included with the DVD retail packaging and used to implement a product registration or activation paradigm in which the multimedia content provider 121 is afforded an opportunity to collect for example, user data, interests, product preferences, or other pertinent demographic information to assist in preventing unlicensed copying and use of multimedia content. Such activation paradigms are commonly implemented to reduce piracy of software. Here, the multimedia content provider 121 offers the consumer an authorization to make managed copies in exchange for the consumer's sending of the activation code. The number and quality of the copies that the user can make may be included in the specific terms of the multimedia content provider's offer among other such terms. Thus, the activation code on the retail package operates as an electronic coupon that is redeemable for one or more managed copies of the multimedia content purchased on the DVD.

Activation codes may also be distributed using traditional or electronic advertising. For example, codes entitling a consumer to make managed copies of a rented DVD may be included as part of DVD multimedia release tie-in. In addition, the user interface screen 900 includes a link 925 that the consumer can follow to gain additional information about obtaining a managed copy activation code. Such link 925 may be provided, for example, by the URI contained in the identification response 723 as described above in the text accompanying FIG. 7.

Once the relevant DVD options 916 are selected and the managed copy activation code is entered in field 923, then the consumer is ready to invoke the methods performed by the managed copy client 605 (FIG. 6) by activating the "Rip" button 930 on user interface window 900.

Turning now to FIG. 10, a flowchart is provided of an illustrative method 1000 for a service to provide a managed copy service to a client. Method 1000 is capable of being performed by the elements shown in FIGS. 1-9 and described in the accompanying text.

The method starts at block 1005. At block 1012, the authorization service 105 receives fingerprint 404 from the multimedia content provider 121 that uniquely identifies a particular multimedia release such as a video, music, software or game. Fingerprint 404 is typically stored in data storage 315 along with other fingerprints associated with other multimedia release so that the authorization service 105 is able to maintain a list (i.e., a database) of all the multimedia releases that are authorized to be copied, as indicated by block 1017.

At block 1022, the authorization service 105 receives a managed copy request 715 from the authorization module 616 in the managed copy client 605. The identification of the source DVD held in source drive 213 is contained in the managed copy request 715 received by the authorization service 105.

At block 1025 the authorization service 105 attempts to authorize the managed copy request 715 from the managed copy client 605 by comparing the source DVD identification against the fingerprints 404 stored in data storage 315. If at decision block 1030 a matching fingerprint is located and the managed copy is authorized, then control is passed to block 1043. If a matching fingerprint is not located by the authorization service 105, then the managed copy is not authorized and the managed copy process is terminated at block 1035. Illustrative method 1000 then ends at block 1039.

At block 1043, the authorization service 105 creates the identification response 723 and transmits it to the managed copy client 605. Optionally, at block 1046, the authorization service invokes a method performed by transaction service 108. Here, a prompt for a payment or activation code is transmitted from the transaction service 108 to the user interface 612 in the managed copy client 605. This step is performed in cases when the multimedia content provider 121 is seeking the completion of a transaction prior to enabling the managed copy to be performed. Alternatively, an offer is generated and transmitted that is more comprehensive in terms of the information provided to the consumer. Such offer is typically constructed using the information contained in the response information 407 that the multimedia content provider 121 provides to the authorization service. The authorization service 105 provides the offer information to the transaction service 108 using the optional connection 142 shown in FIG. 1.

At block 1048 in FIG. 10, the transaction service 108 confirms receipt of the payment or activation code in the optionally utilized transaction process. Upon the completion of any applicable transaction, then authorization service 105 completes the authorization process at block 1055 so that the managed copy client 605 is thus able to perform the managed copy in accordance with the parameters contained in the identification response 723.

At block 1057, updates are made to databases in data storage 315 in the authorization service 105 to reflect the granted authorization to the managed copy request. For example, the number of copies authorized, the extent of offers accepted by consumers, and other statistical, usage, or demographic data may be collected during the managed copy authorization process by the authorization service 105 which may then be passed back to the multimedia content provider 121, for example. Method 1000 ends at block 1062.

Figure 11A:
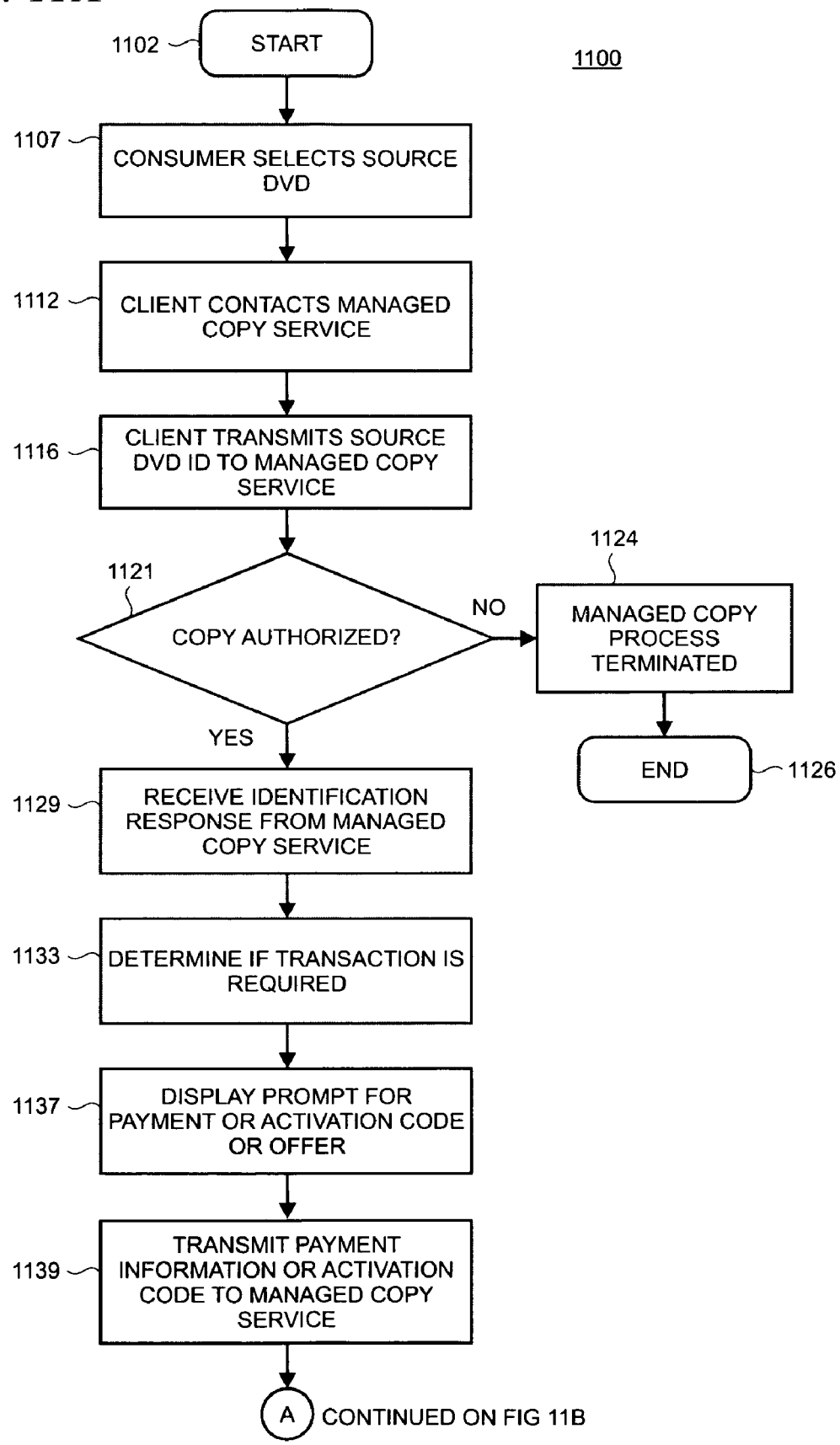
FIG. 11A is a flowchart of an illustrative method for performing a managed copy at a client.
Figure 11B:
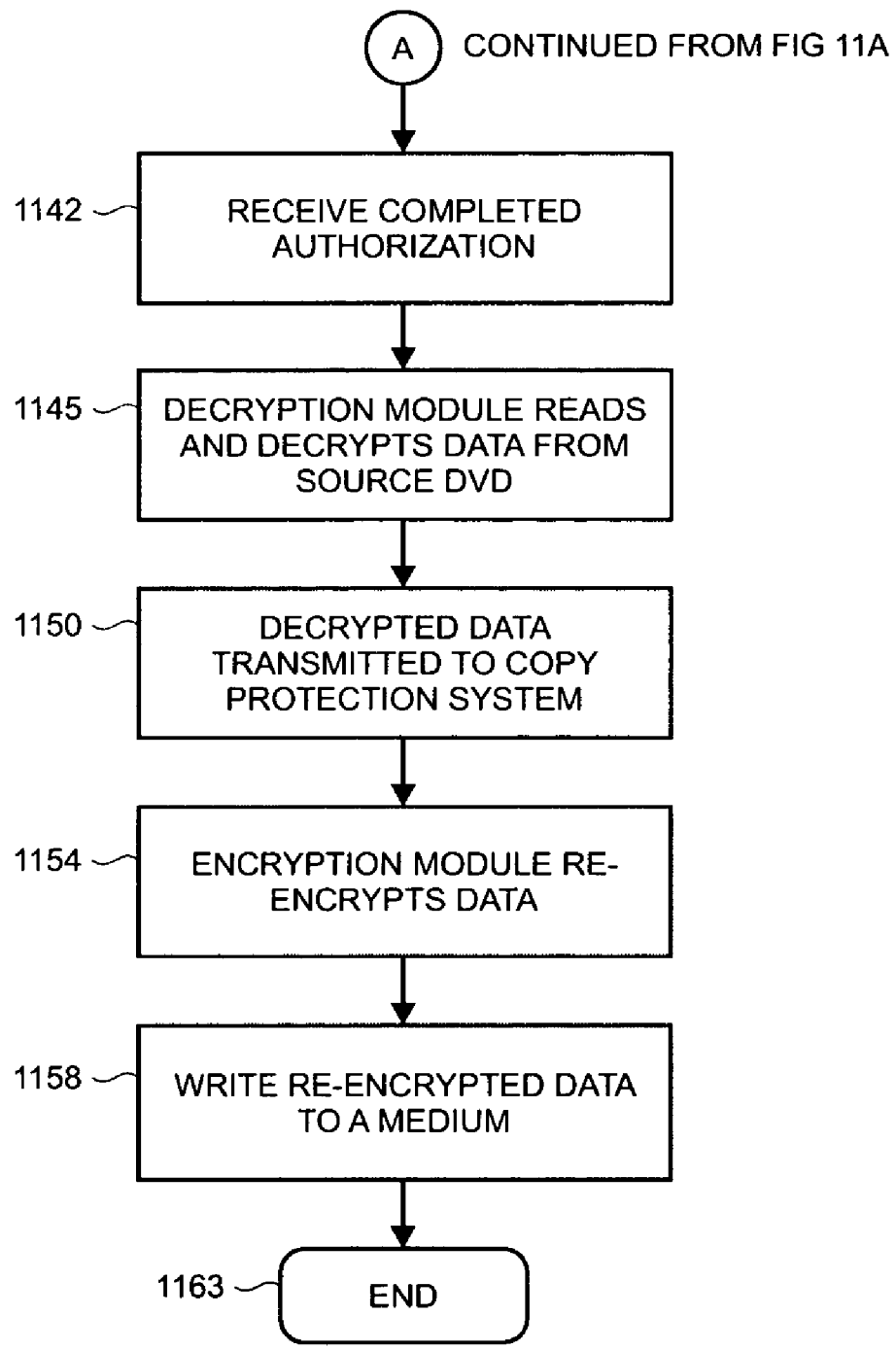
FIG. 11B is a continuation of the illustrative flowchart shown in FIG. 11A.

FIG. 11 is a flowchart of an illustrative method 1100 for implementing a managed copy process at a client. Method 1100 is capable of being performed by the elements shown in FIGS. 1-9 and described in the accompanying text. The method starts at block 1102.

At block 1107, a consumer selects a source DVD to be copied (i.e., "ripped"), typically by inserting the DVD into the source drive 213. In some applications of DVD identification and managed copy authorization, the managed copy client 605 is arranged to auto-launch upon DVD insertion. This allows user interface 612 to expose a user interface (e.g., user interface window 900) to provide the consumer with managed copy features and options. In other applications, the managed copy functions are reachable using commands provided by an operating system operating on PC 102A or through software applications including copy utilities and media players.

At block 1112, once launched, the managed copy client 605 contacts the authorization service 105, typically through an Internet connection, and sends the managed copy request 715. At block 1116, the managed copy client 605 receives the source DVD fingerprint from the source drive 213 and transmits the source DVD fingerprint to the authorization service 105. If the authorization service 105 does not grant authorization for the managed copy at decision block 1121, the managed copy process is terminated at block 1124. Method 1100 then ends at block 1126.

If the authorization service 105 grants authorization at decision block 1121 in FIG. 11, then control is passed to block 1129 where the authorization module 616 receives the identification response 723 from the authorization service 105. In some applications of DVD identification and managed copy authorization, the authorization service 105 supplies license information (e.g., usage rules or policies, or a DRM license such as license information 506 in FIG. 5) with the identification response that is received by the authorization module 616 in the managed copy client 605. In this case, the managed copy client 605 is arranged to pass the license information to the copy protection system 609. In alternative arrangements, the copy protection manager 641 in copy protection system 609 receives the license information from the license service 113.

At block 1133, using the identification response, the managed copy client 605 determines whether the optionally utilized transaction is necessary. If so, then at block 1137 the managed copy client 605 displays a prompt through the user interface 612 for a payment or entry of an activation code (e.g., as shown in activation code field 923 in FIG. 9). Alternatively, user interface 612 is configured to display a more comprehensive offer made by the authorization service 105. At block 1139, the user interface 612 transmits the transaction information or activation code to the transaction service 108. At block 1142, upon conclusion of the transaction, the managed copy client 605 receives the completed authorization from the authorization service 105.

The decryption module 623 in the managed copy client 605 in this illustrative example is arranged to both decrypt and decode encrypted multimedia content read from the source DVD in source drive 213 at block 1145. In some applications of DVD identification and managed copy authorization, the multimedia content on the source DVD in source drive 213 is encrypted using CSS copy-protection. Alternatively, the source DVD is encrypted using other copy-protection methodologies, for example, one of AACS (Advanced Access Content System), Helix DRM, SPDC (Self-Protecting Digital Content), FairPlay, xCP (Extended Copy Protection), OpenMG, Marlin DRM, OMA (Open Mobile Alliance) DRM, Windows Media DRM, or CPRM/CPPM (Content Protection for Recordable Media and Pre-Recorded Media).

At block 1150, decryption module 1150 transmits the decrypted multimedia content to the encryption module 650 in copy protection system 609. The encryption module 650 optionally re-encrypts the multimedia content, at block 1154, responsively to the license information 506 that typically sets limits on the consumer's use of the managed copy. The encryption methodology used in this step may be CSS, for example, or one of the alternatives listed in the description of block 1145. Encryption by encryption module 650 is optional as there may be applications of DVD identification and managed copy authorization where media content is desired by a multimedia content provider to be furnished in the clear, or perhaps with only a watermark, rather than be subject to more restrictive encryption.

In addition to optionally re-encrypting the multimedia content, the encryption module 650 includes an encoder which encodes the multimedia content into a format that is usable by the consumer's media player. Current DVDs are encoded in a manner that is compliant with the MPEG-2 (Moving Pictures Expert Group) standard. Encryption module 650 may thus be arranged to re-encode the multimedia content using this same MPEG-2 coding scheme since many media players and portable media players can play MPEG-2 encoded video either through native support or by use of a plug-in MPEG codec (coder/decoder).

Alternatively, depending on the requirements of a specific application of DVD identification and managed copy authorization, encryption module 650 is arranged to transcode multimedia content from a first format to a second format. That is, the client 102 is arranged so that multimedia content encoded in a first one of a variety of encoding formats is decoded by decryption module 623 and then re-encoded into a second one of the variety of encoding formats by encryption module 650. Such transcoding may be used, for example, to optimize the encoding of the multimedia content to a particular player such as a portable media device such a handheld game, video-capable mobile phone or PDA. With both re-encoding and transcoding, the particular encoding scheme selected and the parameters used may be specified by the encoding parameters contained in the identification response 723 or license information 506.

Table 1 below lists common encoding formats that are usable in various arrangements of DVD identification and managed copy authorization. The first column in Table 1 lists the encoding format (which is also commonly referred to as a container format) and the second column lists the corresponding file extension.

TABLE 1

| Format | File Extension |
| --- | --- |
| Advanced Streaming Format, Advanced Systems Format | .asf |
| Audio Video Interleaved | .avi |
| DivX Media Format | .divx |
| DVD Video Object | .vob |
| Quicktime | .mov, .qt |
| MPEG-2 (Moving Pictures Expert Group) | .mpg, .mpeg |
| MPEG-4 | .mp4 |
| RealVideo | .rm, .ram |
| 3GP | .3gp, .3g2 |
| Windows Media Video | .wmv |

At block 1158, the re-encrypted and encoded (or transcoded) multimedia content is written to a medium. In typical applications in which a PC is the client device (e.g., PC 102A in FIG. 2), the multimedia content is written to data storage such as the PC's hard disk drive for playback using a media player application running on the PC. In other applications, the multimedia content is written to an external device such as a portable media player 232 accessed via the external device interface 225. The multimedia content is also sharable over network 238, for example.

The re-encrypted and encoded multimedia content is also writable to another optical medium such as a CD, DVD or next generation DVD format. When the client is a PC, such task is typically accomplished using multiple optical drives. Alternatively, when the client is a consumer electronic device having multiple optical drives (e.g., consumer electronic device 102B in FIG. 3), the managed copy may be performed by reading from the source drive 313 and writing the re-encrypted and encoded multimedia content to the target drive 321. Method 1100 ends at block 1163.

Figure 12:
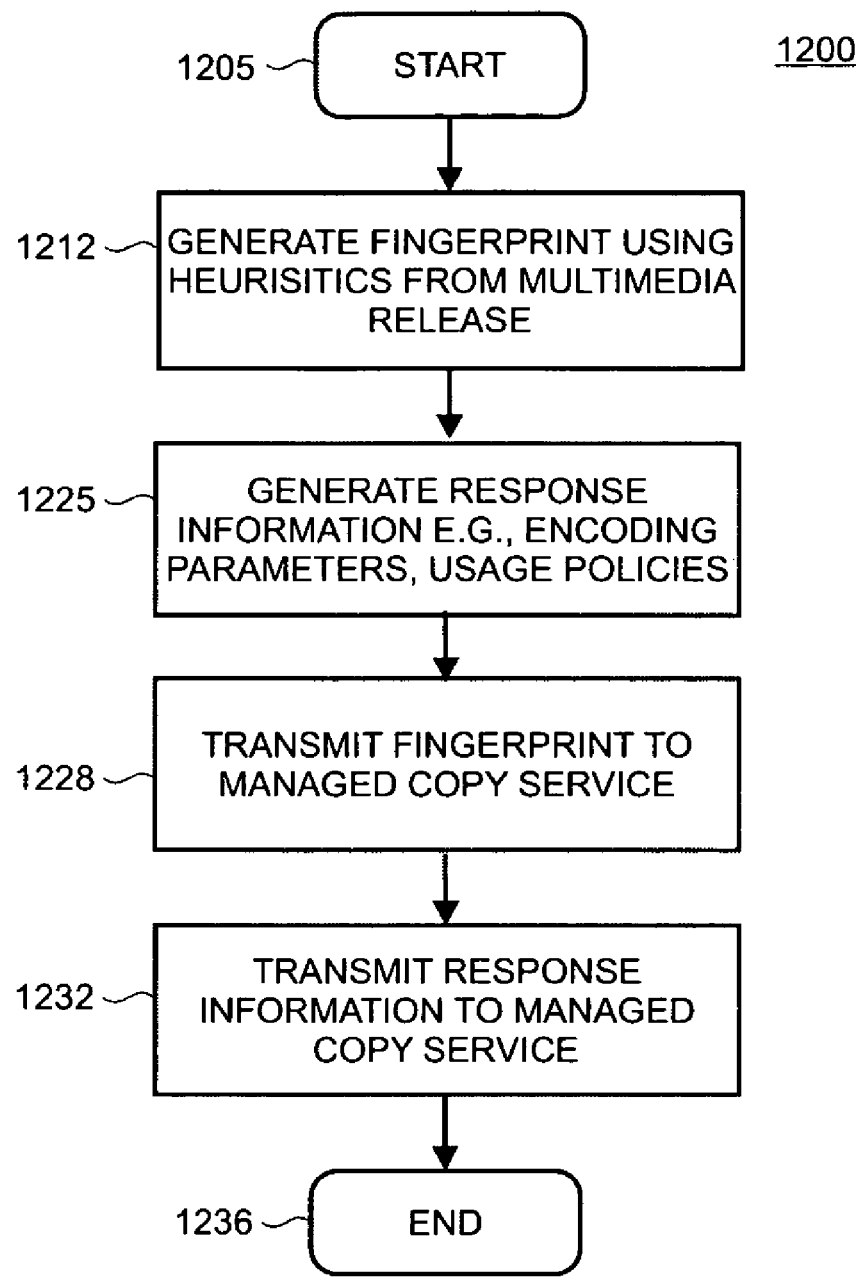
FIG. 12 is a flowchart of an illustrative method for providing fingerprints and response information to a managed copy service.

FIG. 12 is a flowchart of an illustrative method 1200 for providing fingerprints and response information from a multimedia content provider to a managed copy service. Method 1200 is capable of being performed by the elements shown in FIGS. 1-9 and described in the accompanying text. The method starts at block 1205.

At block 1212, multimedia content provider 121 generates fingerprint 404 to uniquely identify a multimedia release. Fingerprint 404 is based on heuristics captured from the multimedia release and typically includes identifying information. At block 1225, multimedia content provider 121 generates response information 407 that is related to a specific fingerprint. Response information typically includes encoding parameters, usage rules, polices and/or DRM licenses.

Multimedia content provider 121 transmits the fingerprint 404 and response information 407 to the managed copy service 135 at blocks 1228 and 1232, respectively. Method 1200 ends at block 1236.

Figure 13:
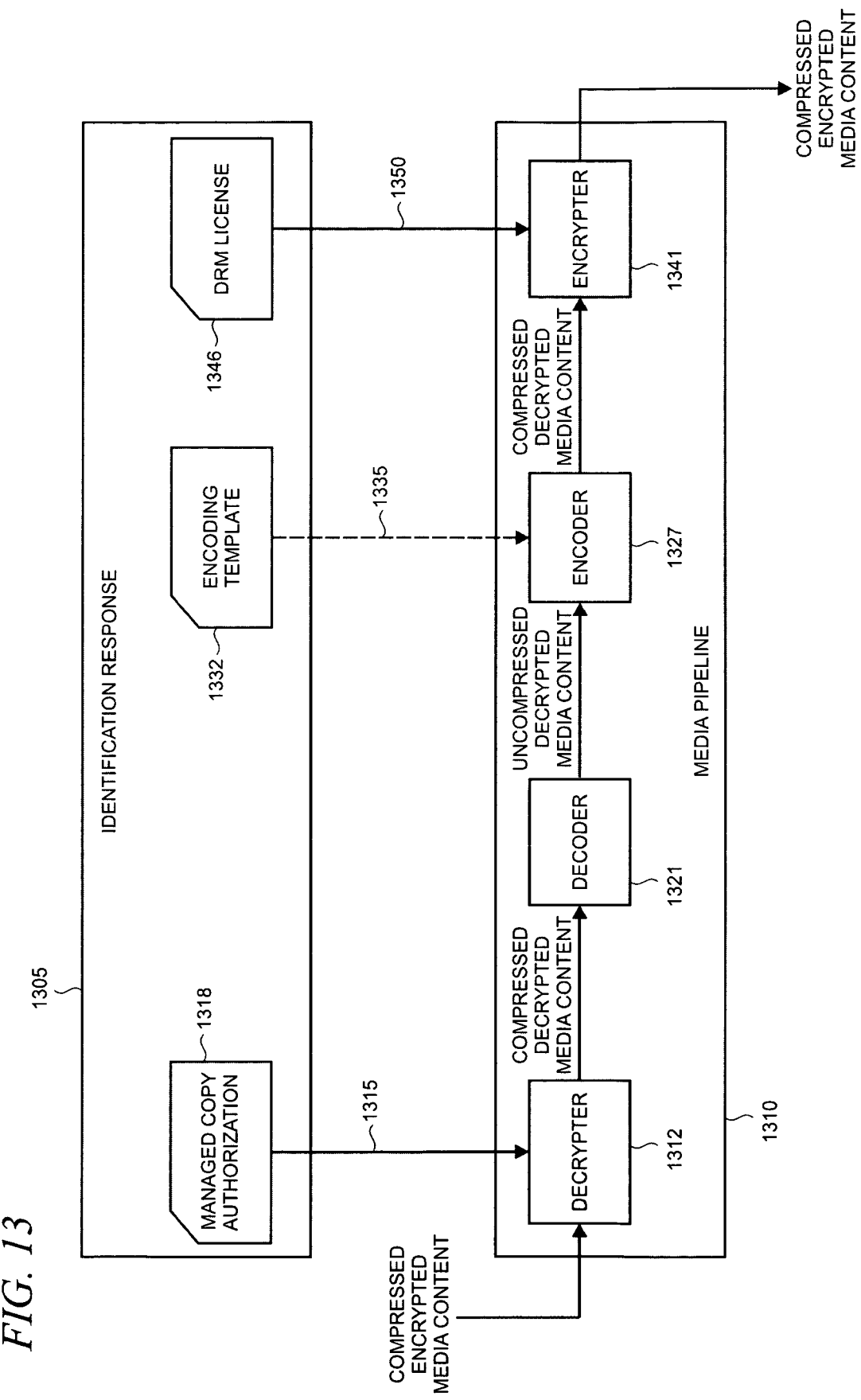
FIG. 13 is block diagram showing the interaction between an illustrative identification response and media pipeline.

FIG. 13 is block diagram showing the interaction between an illustrative identification response 1305 and media pipeline 1310. The identification response 1305 may be arranged in a similar manner as identification response 723 shown in FIG. 7 and described in the accompanying text.

The input to the media pipeline 1310 is compressed, encrypted media content which enters a decrypter 1312. As indicated by line 1315, responsively to a managed copy authorization 1319 contained in the identification response 1305, decrypter 1312 decrypts the media content and outputs compressed, decrypted media content. Decoder 1321 then decodes the compressed, decrypted media content and outputs uncompressed, decrypted media content.

Encoder 1327 re-encodes the uncompressed, decrypted media content and outputs compressed, decrypted media content. Encoder 1327 is optionally arranged to receive an encoding template 1332 in the identification response 1305 on line 1335. Encoding template 1332 includes encoder settings that are optimized for a particular multimedia release and the encoder being used, for example, to provide the highest possible quality playback of the multimedia release, or alternatively the best balance between playback and compression depth.

Encrypter 1341 is optionally utilized to re-encrypt the compressed, decrypted media content responsively to a DRM license 1346 included in the identification response 1305 which specifies the encryption parameters or scheme to be used by the encrypter 1341. Encrypter 1341 outputs compressed, encrypted media content, as shown in FIG. 13.

Although various illustrative arrangements and methods for DVD identification and managed copy authorization have been shown and described, it should be understood that the scope of the claims appended hereto shall not necessarily be limited to the specific features, arrangements or methods described. Instead, the specific features, arrangements or methods are disclosed as illustrative forms of DVD identification and managed copy authorization as more particularly claimed below.

What is claimed is:

1. A computer-readable medium having computer executable instructions for generating a managed copy of copy-protected digital content, the instructions comprising:
   decrypting the copy-protected digital content;
   requesting authorization for the managed-copy in which the authentication request is arranged for evaluation using a fingerprint that uniquely identifies a multimedia release that indicates the multimedia release is authorized for copying, wherein the step of requesting authorization includes generating a session ID;
   if the requested authorization is granted, receiving an identification response where the identification response defines parameters to be applied to the managed-copy, wherein the identification response is correlated to the session ID generated upon requesting authorization; and
   invoking a method for copying the stored decrypted copy-protected digital content using the identification response.

2. The computer-readable medium of claim 1 in which the copy-protected digital content is physically embodied in one of CD, DVD, HD-DVD, Blu-ray disc, optical storage medium, Enhanced Versatile Disk, Digital Multilayer Disk, Forward Versatile Disk, holographic disk, Versatile Multilayer Disk, or flash memory.

3. The computer-readable medium of claim 2 in which the copy-protected digital content includes an activation code disposed on the physical embodiment or packaging attendant thereto.

4. The computer-readable medium of claim 1 in which the multimedia release is selected from one of movie, television programming, game, application software, or music.

5. The computer-readable medium of claim 1 in which the instructions further include providing a user interface for displaying prompts and receiving user inputs responsively to the prompts, wherein the prompts are arranged to facilitate generation of the managed copy.

6. The computer-readable medium of claim 1 in which the instructions further include acquiring information that defines usage rights for the managed copy.

7. The computer-readable medium of claim 6 in which the usage rights impose limits on a number of managed copies generated, or impose usage limits on a subsequent copy generated from the managed copy, or impose limits on playback time of the managed copy, or impose limits on the playback count of the managed copy.

8. The computer-readable medium of claim 1 in which the instructions further include invoking a method for transcoding, responsively to the identification response, the decrypted copy-protected media content from a first format to a second format.

9. The computer-readable medium of claim 8 in which either the first format or second format has a file extension selected from the group consisting of .asf, .vob, .mpg, .mpeg, .mp4, .avi, ,divx, .wmv, .qt, .mov, .3gp, .3g2, .rm, or .ram.

10. A method for enabling managed copying of digital content, the method comprising the steps of:
    generating a fingerprint for uniquely identifying a multimedia release that is authorized for copying, the fingerprint arranged to be usable for authenticating a request for copying the multimedia release, and also response information, wherein said response information includes a URI (Uniform Resource Identifier) that points to the location of additional sources of information; and sending the fingerprint to a data repository for storing a plurality of fingerprints associated with respective ones of a plurality of multimedia releases.

11. The method of claim 10 in which the fingerprint includes heuristics of the multimedia release.

12. The method of claim 10 in which the fingerprint includes identifying information selected from one of title, release owner, authorized distribution region, release version, screen format, language, or release date.

13. The method of claim 10 including the further step of sending response information for the fingerprint to the repository wherein the response information defines parameters applicable to the copying of the multimedia release and the parameters are selected from the group consisting of DRM license rights or encoding parameters.

* * * * *